United States Patent [19]

Witthaus

[11] Patent Number: 5,660,242

[45] Date of Patent: Aug. 26, 1997

[54] SELF STARTING AND BRAKING CLUTCH FOR FLUID COUPLING FOR SMALL ENGINE WITH DIRECT WHEEL DRIVE

[75] Inventor: Charles Allison Witthaus, Hayward, Calif.

[73] Assignee: Patmont Motor Werks, Pleasanton, Calif.

[21] Appl. No.: 561,613

[22] Filed: Nov. 21, 1995

[51] Int. Cl.⁶ .................................................. B62K 11/10
[52] U.S. Cl. ...................... 180/19.1; 180/221; 180/305; 60/367
[58] Field of Search ........................ 180/305, 307, 180/221, 342, 11, 367, 19.1; 280/47.31; 60/367

[56] References Cited

U.S. PATENT DOCUMENTS

| 2,139,107 | 12/1938 | Alison | 60/367 |
|---|---|---|---|
| 2,294,994 | 9/1942 | Maze | 180/307 |
| 2,663,149 | 12/1953 | Zeidler et al. | 60/367 |
| 2,998,782 | 9/1961 | Ryan et al. | 60/367 |
| 3,339,659 | 9/1967 | Wolf | 180/221 |
| 4,821,832 | 4/1989 | Patmont | 180/221 |
| 5,494,128 | 2/1996 | Withous | 180/305 |

Primary Examiner—Richard M. Camby
Attorney, Agent, or Firm—Townsend and Townsend and Crew LLP

[57] ABSTRACT

A fluid coupling is combined with a one way clutch for the direct drive of a wheel from a small engine. The fluid coupling is mounted in cantilevered support or two ended bearing support from a small engine and has a small diameter inner driven shaft and a larger diameter out wheel driving shaft for contacting and directly driving a wheel. The inner driven shaft connects to a pump having a relatively larger outer diameter than either the driven or driving shaft. This pump is mounted on the opposite side of the driven wheel from the engine. The one way clutch is mounted between the inner and outer driven shafts and engages with only one direction of relative rotation between the wheel and engine. At any time that the speed of the engine is less than the current rotating speed of the wheel, the clutch engages. Thus, when the engine is stopped and compression starting the engine from the wheel is desired, the ignition of the engine is connected and forward movement of the wheel directly drives the engine for compression starting. Likewise, and where dynamic braking is desired, the engine ignition is interrupted and results in compression engagement of the engine to the wheel with dynamic braking resulting.

3 Claims, 4 Drawing Sheets 5,660,242

SELF STARTING AND BRAKING CLUTCH FOR FLUID COUPLING FOR SMALL ENGINE WITH DIRECT WHEEL DRIVE

This invention relates to a fluid coupling or torque converter for a small engine which finds use with a direct wheel drive. The fluid coupling or torque converter is provided with one way clutch which engages at any time the engine is moving at a slower speed than the wheel which is being driven. As a direct result of this invention, the engine can be self started, bypassing the clutch and the motor can act as a dynamic brake through the clutch.

BACKGROUND OF THE INVENTION

In U.S. Pat. No. 4,821,832 entitled MOTOR SCOOTER HAVING A FOLDABLE HANDLE AND FRICTION DRIVE of Steven J. Patmont Issued Apr. 18, 1989, there is disclosed a hydraulic fluid coupling or torque converter. This fluid coupling includes an inner motor driven shaft, an outer wheel driving shaft, and a fluid couple between the driven and driving shafts for producing in a motor scooter a fluid drive.

In U.S. patent application Ser. No. 08/136,440 entitled FLUID COUPLING FOR SMALL ENGINE WITH DIRECT WHEEL DRIVE, now U.S. Pat. No. 5,494,128 issued Feb. 27, 1996, a fluid clutch is illustrated. Summarized, a fluid coupling is disclosed for the direct drive of a wheel from a small engine. The fluid coupling is mounted in cantilevered support or two ended bearing support from a small engine and has a small diameter inner driven shaft and a larger diameter outer wheel driving shaft for contacting and directly driving a wheel. The inner driven shaft connects to a pump having a relatively larger outer diameter than either the driven or driving shaft. This pump is mounted on the opposite side of the driven wheel from the engine and preferably includes rotating vanes within one half a toroidal path having an attached eccentrically mounted toroidal plug for causing helical rotation of fluid about the plug. A turbine mates to the pump and includes rotating vanes within the other half of the toroidal path, these vanes being shaped around the toroidal plug of the pump. The toroidal plug and toroidal volumes are eccentrically mounted one with respect to another to cause high velocity flow on the outside diameter of the pump and turbine with low velocity flow in the inside diameter of the pump and turbine. Fluid, typically oil, is confined to the pump and turbine by appropriate seals and causes torque conversion between the pump and turbine. In the preferred embodiment, a fuel tank for the engine is mounted overlying the driven wheel so as to shield the interface of the wheel and driving spindle. At the same time, the exterior of the driven pump is supplied with vanes to generate appropriate air cooling at the fluid coupling. A preferred embodiment is disclosed wherein the mount of the fluid coupler includes a bearing on the outboard end of the fluid coupler. The above entitled Patent Application is incorporated herein by reference.

Normally, small engines contain their own pull starter. Typically, such a starter has a conventional spring actuated retraction mechanism. To start the engine one pulls; to retract the starter cord, one carefully releases the cord.

Combined with a fluid clutch, and applied to a direct drive, two disadvantages are present. First, where the pull starter fails, compression starting the engine through a fluid clutch is all but impossible. Specifically, the vehicle powered by the engine has to be move almost at full speed to permit the clutch to transmit sufficient power to the engine to self start the engine. Secondly, there is no way to use the compression of the engine as a dynamic brake.

In what follows, an improvement on this fluid clutch is disclosed.

SUMMARY OF THE INVENTION

A fluid coupling is combined with a one way clutch for the direct drive of a wheel from a small engine. The fluid coupling is mounted in cantilevered support or two ended bearing support from a small engine and has a small diameter inner driven shaft and a larger diameter outer wheel driving shaft for contacting and directly driving a wheel. The inner driven shaft connects to a pump having a relatively larger outer diameter than either the driven or driving shaft. This pump is mounted on the opposite side of the driven wheel from the engine. The one way clutch is mounted between the inner and outer driven shafts and engages with only one direction of relative rotation between the wheel and engine. At any time that the speed of the engine is less than the current rotating speed of the wheel, the clutch engages. Thus, when the engine is stopped and compression starting the engine from the wheel is desired, the ignition of the engine is connected and forward movement of the wheel directly drives the engine for compression starting. Likewise, and where dynamic braking is desired, the engine ignition is interrupted and results in compression engagement of the engine to the wheel with dynamic braking resulting.

DESCRIPTION OF THE PREFERRED EMBODIMENT

Figure 1:
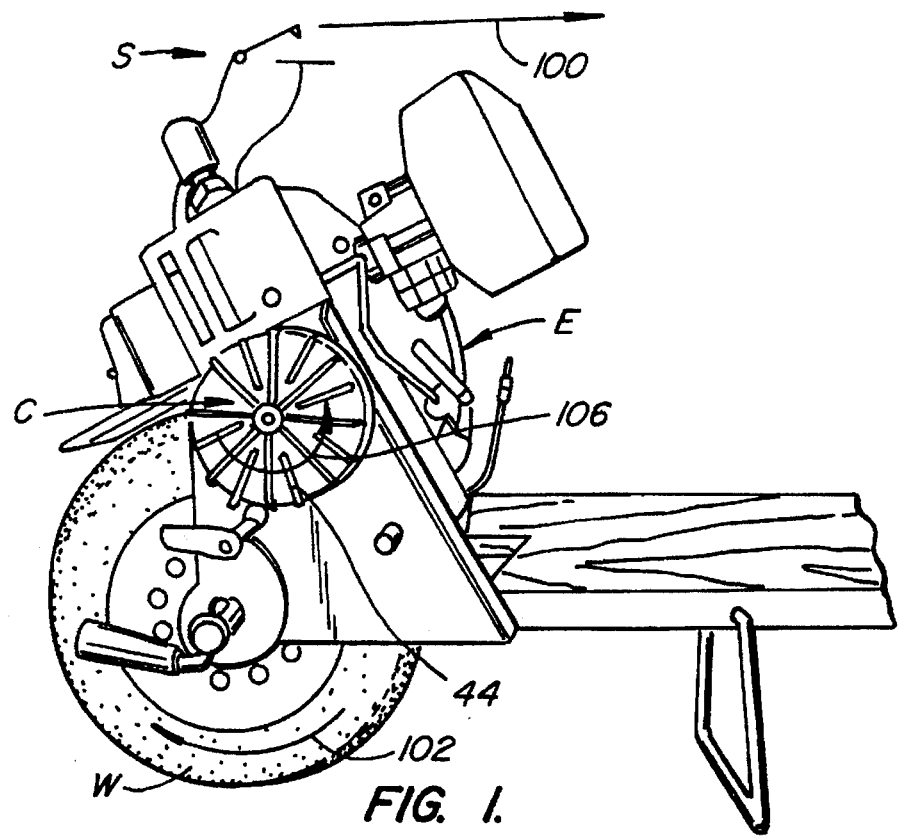
FIG. 1 is a perspective elevation of a scooter having the drive of this invention at the rear wheel.
Figure 2:
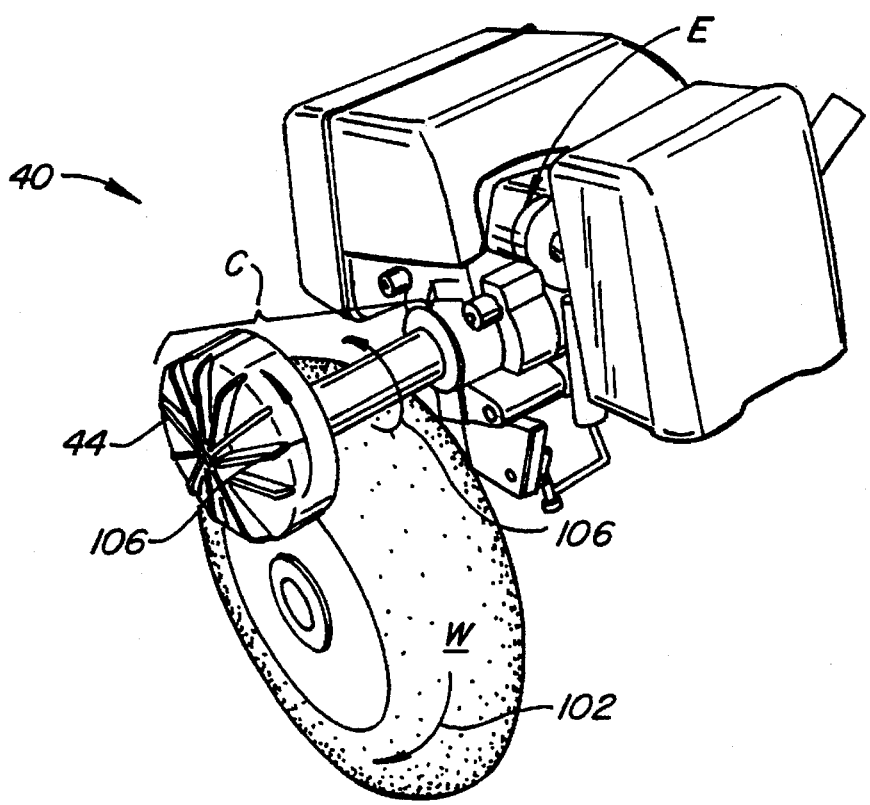
FIG. 2 is a an expanded perspective section of the fluid coupling illustrating the engine and fluid coupling suspended with respect to the driven wheel, the scooter chassis and wheel axle being omitted.

Referring to FIGS. 1 and 2, fluid coupling C is disclosed for the direct drive of wheel W from a small engine E. The fluid coupling is mounted in cantilevered support from small engine E, FIG. 1 showing the engine and rear end of the scooter and FIG. 2 showing wheel and engine alone.

Figure 3:
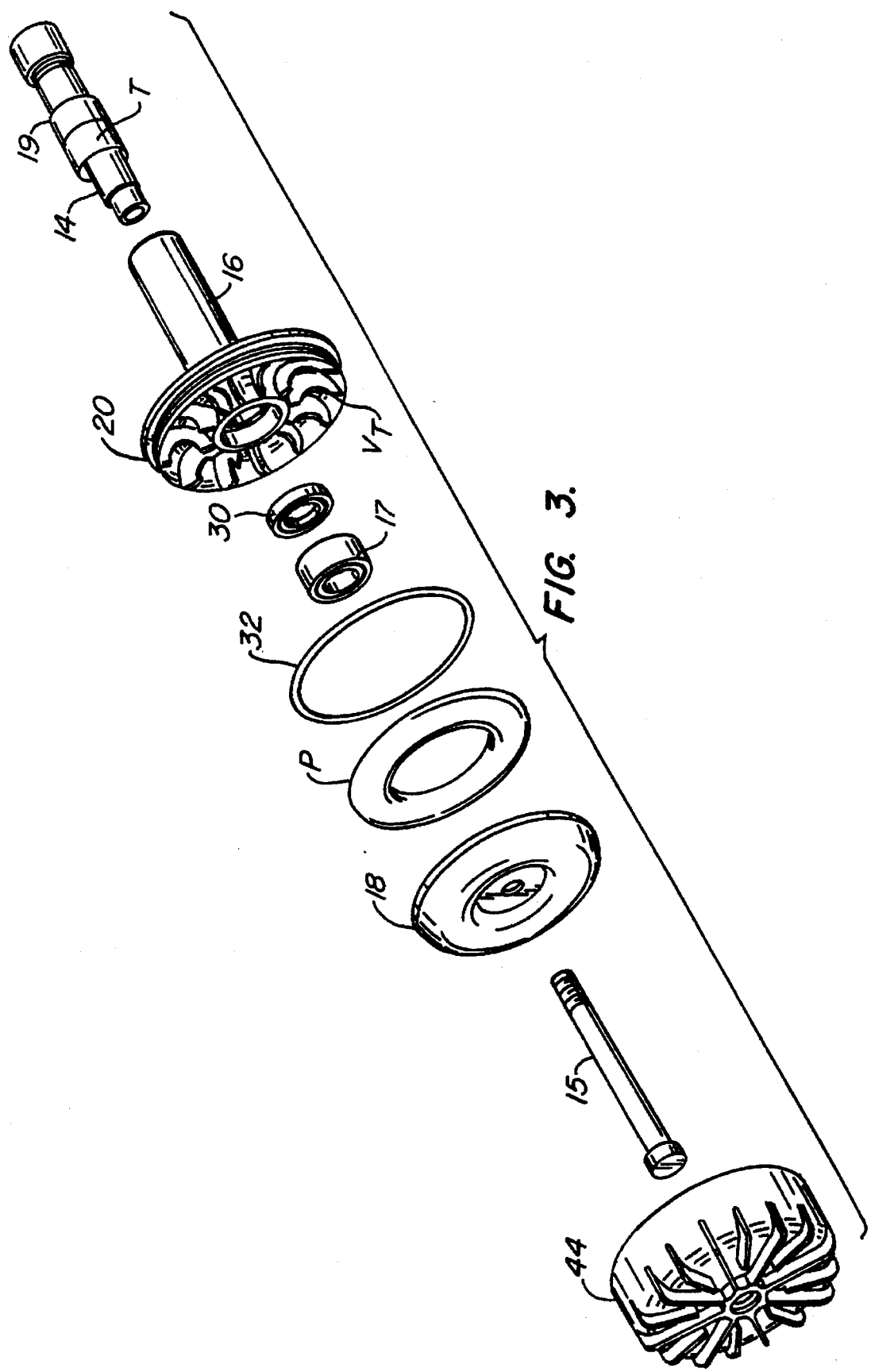
FIG. 3 is an exploded view of the fluid coupling relative to the engine from which the fluid coupling is mounted with the insertion of the one way clutch specifically illustrated.

Referring to the exploded view of FIG. 3, fluid coupling C has a small diameter inner driven shaft 14 and larger diameter outer wheel driving shaft 16 for contacting and directly driving wheel W. Inner driven shaft 14 connects to pump 18 having a relatively larger outer diameter than either the driven shaft 14 or driving shaft 16. Such connection occurs by bolt 15 threading to driven shaft 14. Further, it can be seen that regular ball bearing 17 and needle bearings 19 provide the necessary rotating bearings to assure transfer of the rotation. Pump cooling is provided by air vanes 44. Centrally of pump 18 there is toroidal plug P. Attached to larger diameter outer wheel driving shaft 16 is turbine 20 with rotating vanes $V_T$.

Figure 4:
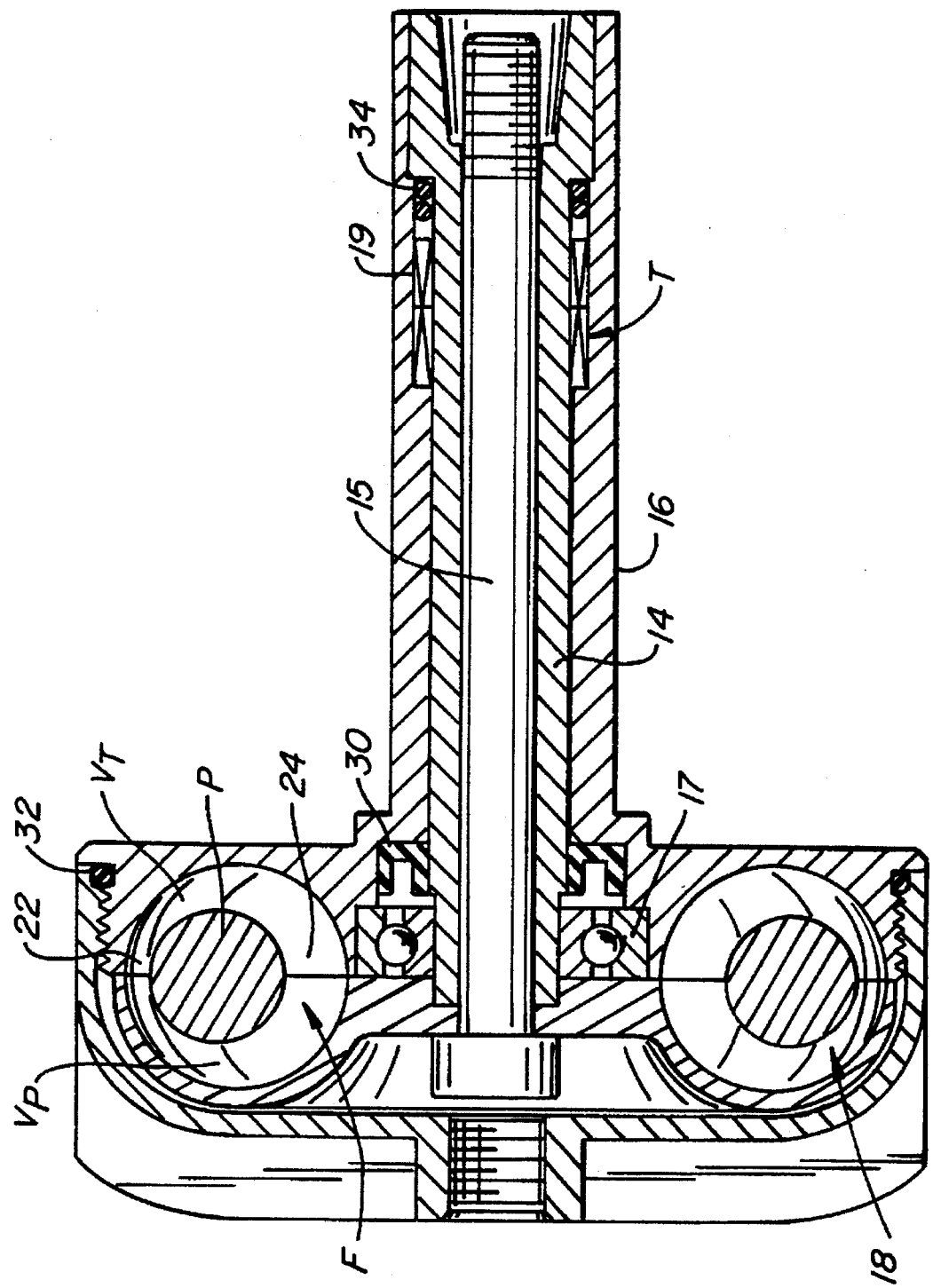
FIG. 4 is a side elevation section of the pump, turbine and pump cover illustrating the placement of the one way clutch.

Referring briefly to FIG. 4, it will be understood that fluid F fits interior of pump 18 at outside diameter 22 of toroidal plug P. Fluid F transfers driving energy from small diameter inner driven shaft 14 to larger diameter outer wheel driving shaft 16.

Clutch T is mounted adjacent needle bearings 19 to provide one way coupling of the rotation of wheel W to engine E. This one way coupling may be briefly described. Accordingly, the relative direction of rotation resulting in clutch engagement will be first set forth. Secondly, and with respect to FIG. 5, the operation of clutch T will be discussed.

Referring to FIGS. 1 and 2, when vehicle V is driven in forward direction 100, wheel rotation must occur in forward rotation direction 102. Accordingly, fluid coupling C must rotate in direction 104 with outer driving shaft 16 from fluid coupling C.

First, for such rotation to occur, engine E at its output shaft must always drive small diameter inner driven shaft 14 at speed faster than the driven speed that larger diameter outer wheel driving shaft 16 drives wheel W. Secondly, this invention operates on the principle that any time small diameter inner driven shaft 14 rotates at a speed of rotation less than larger diameter outer wheel driving shaft 16, clutch T engages. It is to be noted, there are only two operating conditions under which this occurs.

First, when the engine is stopped, and starting of the engine under compression is desired, movement of wheel W in forward direction 102 will rotate larger diameter outer wheel driving shaft 16 and through clutch T small diameter inner driven shaft 14. For such starting to occur, ignition switch S shown schematically in FIG. 1 will have to be closed.

Secondly, and presuming that dynamic braking of wheel W is desired, stopping engine E relative to wheel W by opening ignition switch S will cause engine E to stop—while wheel W continues to rotate. When this occurs, clutch T will engage causing engine E to rotate in compression and thus dynamically brake wheel W.

Figure 5A:
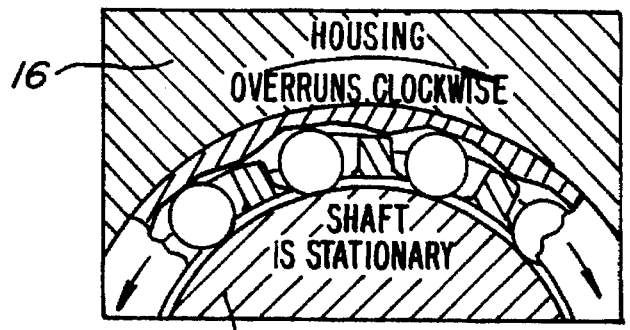
FIG. 5A and 5B are illustrations of the one way clutch in the over run mode and FIGS. 5C and 5D are illustrations of the one way clutch in the lock mode.

Referring to FIGS. 5A–5D, operation of clutch T is readily understood. In FIG. 5A, small diameter inner driven shaft 14 is stationary, and wheel W moves backwards or opposite to forward direction 100. With small engine E stopped, backwards motion of wheel W can occur.

Figure 5B:
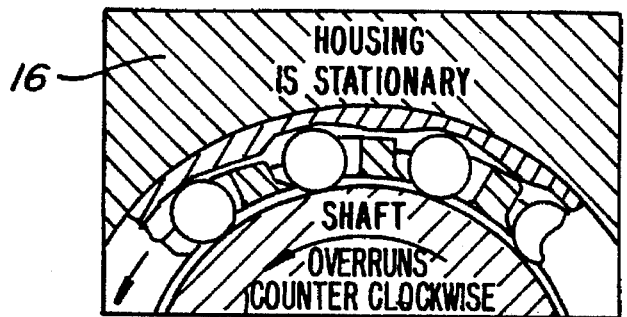

In FIG. 5B, normal driving of wheel W is seen. Small diameter inner driven shaft 14 is driven faster than larger diameter outer wheel driving shaft 16. Clutch T is not engaged.

Figure 5C:
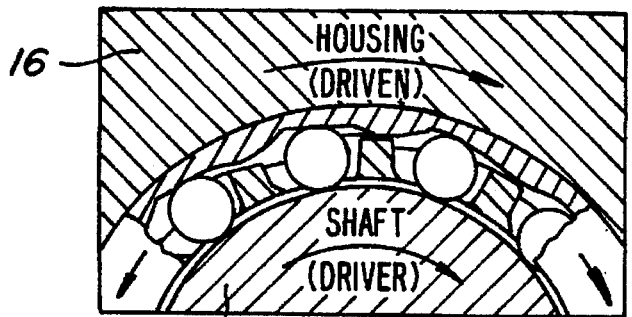

In FIG. 5C, braking of wheel W through compression from small engine E is illustrated. Larger diameter outer wheel driving shaft 16 is driven by wheel W. It in turn through clutch T drives small diameter inner driven shaft 14. With ignition switch S open, compression braking of wheel W results.

Figure 5D:
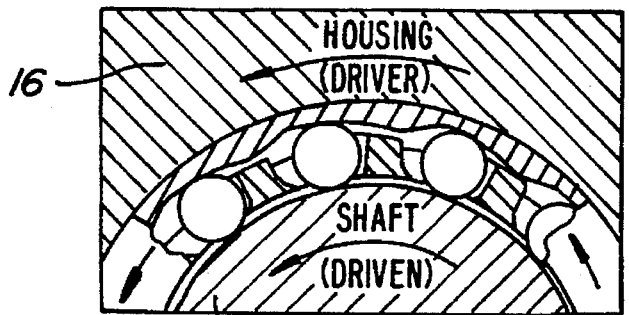

In FIG. 5D, wheel W drives small engine E to start the small engine. Larger diameter outer wheel driving shaft 16 is driven by wheel W. Small diameter inner driven shaft 14 is driven through the locked clutch. With ignition switch S closed, engine starting results.

Thus, operation of the device is deceptively simple. With ignition switch S closed, compression starting of engine E easily occurs. Likewise, with ignition switch S open, dynamic braking of wheel W likewise occurs.

What is claimed is:

1. In combination:

a wheel to be driven in a forward direction;

a vehicle including a frame mounting the wheel to be driven in the forward direction for rotation about an axis;

a rotary engine driven by an ignition, the rotary engine having rotation to drive the wheel in the forward direction and mounted to the frame and having an output shaft substantially parallel to the axis of rotation of the wheel;

a fluid coupling having an input shaft connected to the output shaft of the engine and having a fluid coupling output shaft connected to the wheel to be driven, the improvement to the fluid coupling comprising in combination:

a one way clutch for engagement between the input shaft and the fluid coupling output shaft when the wheel moves in the forward direction at a rate of speed greater than a current rotation of the engine would drive the wheel in the forward direction.

2. The combination of claim 1 and further including:

means for connecting and disconnecting the ignition.

3. The combination of claim 1 and further including:

an output shaft of the engine connected to the engine on one side of the wheel to be driven, and extending across the wheel to be driven on the opposite side of the wheel to be driven;

a pump connected to the driven shaft and rotating about the driven shaft on the opposite side of the wheel from the engine;

fluid communicated to the pump for receiving rotational energy from the engine;

the output shaft of the fluid coupling having the outer and wheel driving shaft concentrically mounted about and concentric to the inner and driving shaft;

a turbine mounted to the outer and wheel driving shaft and juxtaposed to and in fluid communication with the pump on the opposite side of the wheel for receiving rotational energy from the fluid passing through the pump; and, means sealing fluid between the pump and turbine for enabling fluid circulating between the pump and turbine to transfer torque between the pump and turbine and hence the input and output shaft for the driving of the wheel.

* * * * *